United States Patent Office 3,419,214
Patented Dec. 31, 1968

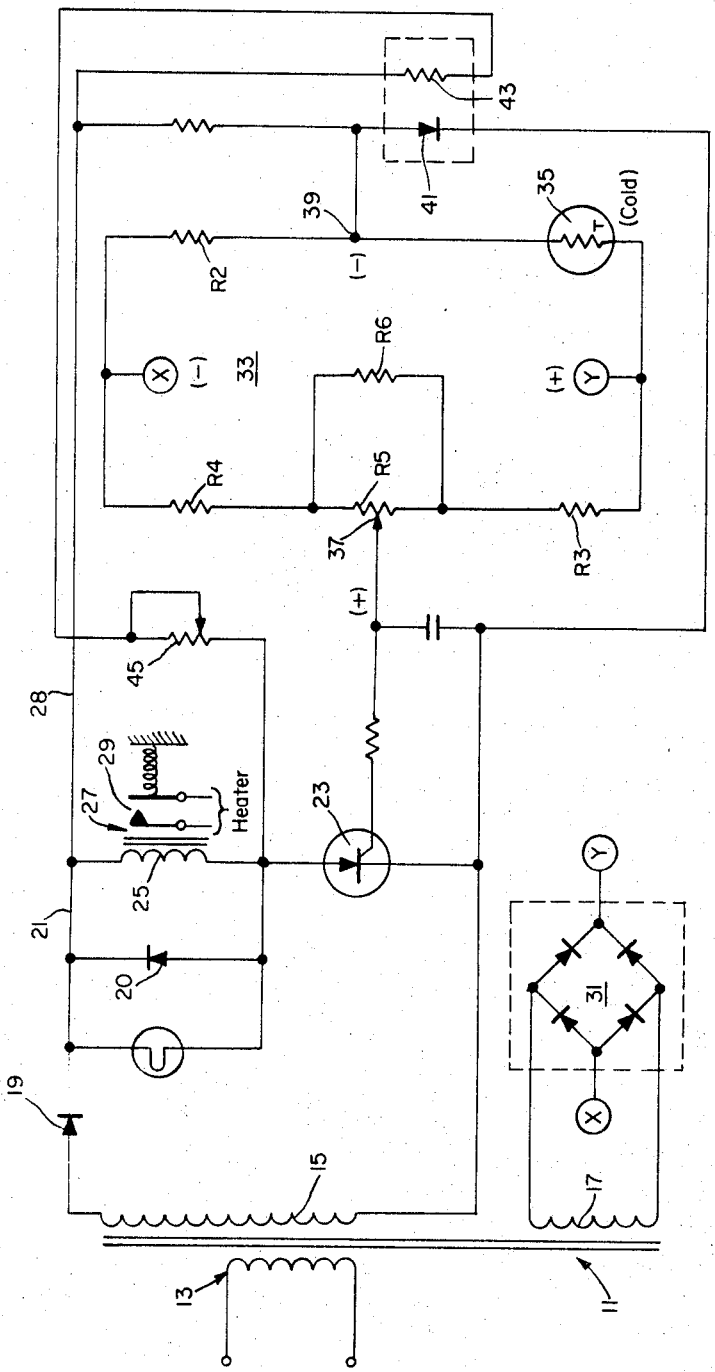

3,419,214
TEMPERATURE REGULATING SYSTEM
Egils Evalds, Ardmore, Pa., assignor to Athena Controls Incorporated, a corporation of Pennsylvania
Filed Feb. 6, 1967, Ser. No. 614,269
9 Claims. (Cl. 236—78)

ABSTRACT OF THE DISCLOSURE

The present invention provides a circuit for controlling the heat generated by a controllable heat generator. A typical bridge circuit is employed with a temperature sensitive element in one leg thereof. A principal switching element is controlled by the bridge, and the bias required to operate said switching element is offset by the circuit so that the bridge operates as a balanced bridge. In addition the circuit provides a means to vary the offset as the bridge approaches its null point so that the switch is turned off in anticipation of the bridge reaching the null point.

This invention relates to temperature regulating systems and more particularly to a system which makes provision for the heat inertia characteristic of the heat generating apparatus which is employed with the system.

BACKGROUND

In temperature regulating systems there are numerous ways employed which enable the systems to sense the desired temperature, or temperature range, and in response stop the heat generator from producing more heat (or in the alternative cause the heat generator to generate heat). The most common of such arrangements is the household thermostat which usually employs a bi-metal switch and which acts to cut off or reduce the furnace activity.

In all temperature regulating systems there is the problem of heat inertia. That is to say the apparatus which is generating the heat continues to generate heat for a finite period of time after the energy applied thereto has been cut off. The heat inertia problem becomes critical in the case of furnace systems which are used to manufacture items that must be precisely exposed to heat. For instance in evaporation deposition of metal on a substrate, the evaporant will flow to the substrate as long as the source of metal evaporant is heated above a critical temperature. If a certain thickness of metal is required on the substrate then it is highly desirable to precisely terminate the evaporant flow after the proper layer of metal has been deposited. The problem of heat inertia of course becomes apparent.

SUMMARY

The present invention provides a balanced bridge circuit with a temperature sensitive element in one leg thereof. A silicon controlled rectifier acting as the principal switch has its control elements connected, through a diode, across the bridge. The diodes provides an offset for the bridge so that when the bridge reaches its null point the SCR is turned off. In addition the circuit provides a means to heat the diode so that the offset is varied such that the diode (1) follows the environmental conditions which affect the SCR and (2) anticipates the turn off point of the SCR in order to accommodate the heat inertia problem. The diode heater can be adjusted to provide very precise regulation.

The advantages of the present invention will be apparent and will be suggested to those skilled in the art, from a reading of the following specification and claims in conjunction with the figure which is a schematic diagram of the novel circuit.

In the figure there is depicted a transformer 11 having a primary winding 13 and two secondary windings 15 and 17. The primary winding 13 is connected to a source of A.C. current (not shown) which develops A.C. current in both of the secondary windings 15 and 17.

The A.C. signal which is induced in secondary winding 15 is subjected to half wave rectification by the diode 19 so that there is pulsating D.C. current appearing on line 21. If the silicon control rectifier 23 is turned on, the pulsating current will pass through the coil 25 of relay 27 thereby connecting the heating element, through the points 29, to a source of power.

Accordingly let us examine what turns on the silicon control rectifier 23. It will be noted that the lower secondary winding 17 is connected to a full wave rectifier 31 whose D.C. output is supplied to terminals $x$ and $y$. The $x$ and $y$ terminals are in turn connected to the bridge 33 and provide D.C. voltage thereacross.

The bridge 33 is composed of resistors R2, R3, R4, parallel resistors R5 and R6 and the thermistor 35. The parallel resistors R5 and R6 constitute an adjustable resistance element used to balance the bridge. A potentiometer could be employed to effect this last described adjustment. The thermistor 35 is physically placed in the area to be controlled. As is well known when the temperature increases the resitance of the thermistor decreases and the voltage developed thereacross decreases.

The tap 37 of the adjustable resistor is one of the output points of the bridge and it is connected to the control element of the silicon controlled rectifier 23. The other output signal point of the bridge is point 39 which is connected through diode 41 to the cathode of the silicon controlled rectifier 23. In the preferred embodiment the silicon controlled rectifier 23 is a type 2N2323A manufactured by the General Electric Corporation; but other types may be used. This particular SCR needs a bias of .6 volt between its control element and its cathode to cause it to fire or conduct. It becomes apparent then (if we ignore the fact that the diode 41 is connected in the circuit) that there would have to be a difference of .6 volt between points 37 and 39 in order for the SCR 23 to be turned on. It is also apparent that before the bridge 33 reaches its null point the SCR 23 will be turned off (if we consider a situation where the SCR 23 has been conducting and the area has been getting warmer).

In order to operate under such circumstances the bridge would have to operate as an unbalanced bridge. Such an arrangement has undesirable characteristics from a design standpoint. For instance the variation in characteristics as a result of aging are different in resistors as compared with silicon elements and accordingly the unbalance which might be arranged to provide the operating bias might well be different from one given time to another. In addition, the output of a bridge is proportional to the input voltage times the percent (or degree of) unbalance. For instance, if there is a six volt input and a ten percent unbalance, the output would be .6 volt. If the line voltage changed to 6.6 volts the output would be .66 volt. When a bridge is employed as a balanced bridge, it is insensitive to line voltage variation.

The present system therefore provides the diode 41 connected into the output circuit from the bridge to the cathode of the SCR 23. The diode 41 in the preferred embodiment is a 1N4154 manufactured by the General Electric Corporation, although other diodes might be used. Diode 41 has the same voltage-current characteristics as the SCR 23. Accordingly the environmental conditions that affect the SCR 23 also affect the diode 41 and in the same fashion. The voltage drop across diode 41 under normal operating conditions is .6 volt. It follows that when the bridge is at a null condition the voltage drop developed across the diode 41 is barely sufficient to cause the SCR 23 to conduct. Hence the bridge 33 can be designed and operated as a balanced bridge.

Disposed in close proximity to the diode 41 is a heating element 43. As will be better understood from the description below, the heating element 43 conducts a predetermined amount of current and in response thereto generates heat. The heat generated causes the voltage drop across the diode to decrease so that prior to the bridge reaching its null point, the SCR is turned off.

The heating of the diode to alter the turn off time of the SCR provides a vernier type of control for the larger sensing circuit. In other words by empirical methods, or otherwise, the time that the heating element should be on (once it has reached its approximate operating condition) to give uniform heat can be determined. Once such a time is determined the diode can be brought up to the proper temperature in this determined time and cycled accordingly to turn the system on and turn it off. If there are any drastic changes in the operating conditions the output signal from the bridge (which acts as a pedestal type signal in this arrangement) will be sufficiently low or high to render the diode variation ineffective. Such an operation is as it should be.

Now consider in detail the operation of the system. Assume first that the thermistor 35 is placed in a furnace area and the area is cold. Assume also that the operator is desirous of bringing the furnace up to full heat in a minimum amount of time (such a procedure being the general operation). Also assume that it has been determined that under normal full heat operation the temperature can be held at virtually a constant level if the heater is turned on and off every 30 seconds. In accordance with this last assumption, assume that the adjustable resistor 45 has been set so that the current through the heater 43 will be sufficient to produce enough heat in 30 seconds to warm the diode so that its voltage drop thereacross is .4 volt instead of .6 volt (the latter voltage drop occurring under normal operating conditions without the heater).

With these assumptions in mind let us examine what happens. Initially the thermistor 35 is cold and therefore offers a high resistance to the bridge circuit. Accordingly, output point 39 experiences a negative voltage value as compared with the output point 37. The difference in voltage between points 37 and 39 is far in excess of .6 volt and this difference is applied across the control element and cathode of the SCR 23. In response the SCR 23 is conductive.

With the SCR 23 being conductive current flows from the high side of the secondary winding 15 through the diode 19, through the coil 25 and through the SCR 23 to the other side of the secondary winding 15. Actually the current is pulsating D.C. current since the A.C. signal developed on the secondary winding 15 is half wave rectified by the diode 19.

The current passing through the winding 25 energizes the core of the relay 27 and causes the points 29 to close. When the points 29 close, the heating elements of the furnace is turned on and heat commences to be generated. Now it should be understood that the relay 27 remains "energized" during the half cycles that the current is not passing through the diode 19 by virtue of the flyback diode 20. In addition the mechanical inertia of the relay points aids to keep them closed from one conducting half cycle to the next conducting half cycle. In short, the relay remains energized until the SCR is cut off.

As the temperature rises the resistance of the thermistor decreases and the voltage at point 39 becomes less negative and approaches that at point 37. Accordingly, the difference in voltage across the SCR decreases. However it will be recalled that by design the diode 41 was chosen to have a .6 volt drop so that without other considerations the system would work to let the difference of potential between points 37 and 39 approach zero and still have the SCR conducting.

Actually to warm the furnace up to operating heat from a cold status takes a reasonable amount of time so that the current is passing along line 28, through resistor 43, through resistor 45 to the anode of the SCR for a reasonably long time. Therefore the diode 41 is heated to a point where its voltage drop approaches .1 volt. It follows that long before the bridge reaches a null point, i.e., zero differences of voltage between points 37 and 39, the SCR 23 will be turned off. It will be recalled that in the preferred embodiment SCR 23 needs a bias of .6 volt to conduct. Hence when the difference of potential between points 37 and 39 is slightly less than .5 volt the SCR will be turned off. When the SCR is cut off, relay 27 drops out and energy ceases to be applied to the heating element.

It is during this period that the heat inertia is most dramatic. The heating element having been driven at a full rate, continues to radiate heat even though the applied energy ceases. However the rated temperature had been reached when this occurred because the rated temperature causes the thermistor 35 to assume a certain resistance which provides a null condition across the bridge. In our example the furnace had not attained that temperature before the SCR was turned off. In other words the additional heat radiated by the heating element does not drive the temperature of the furnace beyond its desired operating value but only toward that value.

Meantime the heater resistor 43 is cooling off and the diode 41 is cooling off. These elements are located out of the furnace area and so they cool off rapidly to the ambient atmosphere.

When the diode 41 has cooled sufficiently so that it once again provides approximately a .6 volt drop thereacross the SCR will be turned on again and the heating element in the furnace will be once again turned on. It should be understood that if the heat inertia drove the thermistor to a temperature above the desired operating level, the cooling off of diode 41 would not turn on the SCR. The furnace must be at the desired operating value or less in order for the diode to effect a turn on of the SCR 23.

Having set the adjustable resistor 45 for a 30 second time cycle, we find that it will take the heater 43 approximately 30 seconds to heat the diode 41 so that its voltage drop falls substantially below .6 volt. It should be understood that there are two operations going on in response to the diode operating to start the SCR. Since the furnace has been inoperative for a period and there is start-up inertia for the heating element (the thermistor 35 having cooled somewhat) the difference of potential across the bridge may be as great as .2 volt. This difference of voltage acts as a pedestal voltage to which the voltage drop of diode 41 is added.

As the furnace commences to heat the difference of potential between points 37 and 39 becomes less and simultaneously the diode 41 voltage drop decreases. When the cumulative voltage difference is less than .6 volt, the SCR is turned off. The temperature of the furnace may not have reached its desired value but the heat inertia is in effect. Meanwhile, the diode 41 is cooling off. This cycling operation continues with incremental heating, incremental turning off in anticipation of reaching full temperature to allow for the inertia effect, and turning on again before too much cooling takes place in the furnace to keep the heat generated in the desired range.

Now obviously a 30 second cycle is arbitrarily chosen for this explanation. The adjustable resistor 45 can effect any desirable cycle time. By choosing the diode characteristics, or even serially connecting diodes, compensation can be had for the initial high inertia when a furnace is first heated. Finally it should be recognized that the example of the invention in operation was described with a furnace, only by way of example. This invention can be advantageously employed with other items needing temperature regulation.

It should be re-emphasized that it is advantageous to employ the offset-heatable diode to control the cycle time of the furnace because it can be designed to be anticipatory of the furnace reaching in operation level, it can operate the system without being subject to the heat ineria and the start-up inertia, it permits the system to use a balanced bridge and the control element has the same characteristics as the main switching element which wipes out or integrates any error due to ambient condition changes which might affect the control circuit per se.

What is claimed:

1. A circuit for regulating the temperature of a particular device comprising in combination: a bridge circuit, arranged to be operated as a balanced bridge, having first and second output terminals and having one leg thereof, with two terminals, which is a variable voltage leg whose voltage thereacross varies with the ambient temperature thereof, said first output terminal connected to one terminal of said variable voltage leg; switching means which requires a voltage bias to be made active; a control element whose voltage varies with the ambient tempearture; heater means connected to said switching means and disposed in close proximity to said control element to selectively supply heat to said control element, said heater means being activated to supply heat to said control element in response to said switching means being made active to effect a supply of heat to said particular device; first circuitry means connecting said first output terminal through said control element to said switching means and connecting said second output terminal to said switching means whereby the voltage developed at the output of said bridge and the voltage developed across said control element are applied as a bias across said switching means and whereby said control element acts to decrease the bias across said switching means towards zero bias in response to said heater means being activated and in anticipation of said bridge circuit having a null voltage being developed; and means for applying or not applying heat to said particular device connected to said switching means.

2. A circuit for regulating the temperature according to claim 1 wherein there is further included second circuitry means connecting said heater element in parallel with said means for applying or not applying heat so that said heater is energized for a period of time which is related to the period of time said means for applying or not applying is active.

3. A circuit for regulating the temperature according to claim 2 wherein there is further included in said second circuitry means a variable resistor means to render selectable the amount of heat produced by said heater.

4. A circuit for regulating the temperature according to claim 1 wherein said one leg whose voltage thereacross varies with the ambient temperature thereof includes a thermistor.

5. A circuit for regulating the temperature according to claim 1 wherein said control element is a diode and wherein said heater is a resistor.

6. A circuit for regulating the temperature according to claim 1 wherein said switching means is a silicon controlled rectifier having an input element, a control element, and an output element and wherein said first output terminal is connected to said output element and said second output terminal is connected to said control element.

7. A circuit for regulating the temperature according to claim 1 wherein said means for applying or not applying heat includes a relay whose coil is connected to said switching means and whose points are serially connected in a heater circuit.

8. A circuit for regulating the temperature according to claim 7 wherein there is further included a diode connected across said relay coil to keep said coil energized during brief intervals of no applied voltage.

9. A circuit for regulating the temperature according to claim 5 wherein said diode has a voltage drop thereacross, when said bridge circuit is at a null condition, which is the minimum bias to turn on said switching means.

References Cited

UNITED STATES PATENTS

| | | | |
|---|---|---|---|
| 2,148,491 | 2/1939 | Moore | 236—68 |
| 2,729,396 | 1/1956 | Impey et al. | 236—68 |
| 3,211,214 | 10/1965 | Chambers | 236—68 X |
| 3,231,802 | 1/1966 | Myers | 318—29 |
| 3,274,375 | 9/1966 | Beltz | 219—501 |
| 3,330,158 | 7/1967 | Simonyan et al. | 73—362 |

ROBERT A. O'LEARY, *Primary Examiner.*

W. E. WAYNER, *Assistant Examiner.*

U.S. Cl. X.R.

219—501; 236—68; 307—310; 317—153; 340—233